Sept. 16, 1930.   A. P. BRUSH   1,776,144
VIBRATION DAMPENER
Filed Oct. 15, 1928

INVENTOR
Alanson P. Brush
BY Whittemore Hulbert
Whittemore & Belknap
ATTORNEYS

Patented Sept. 16, 1930

1,776,144

UNITED STATES PATENT OFFICE

ALANSON P. BRUSH, OF DETROIT, MICHIGAN

VIBRATION DAMPENER

Application filed October 15, 1928. Serial No. 312,716.

This invention relates to vibration dampeners of that type applicable to engine crank shafts and other rotary members which are subject to rapidly alternating positive and negative accelerations. Such devices comprise essentially a member carried by the rotating body non-positively connected thereto so as to be capable of independent movement, together with friction means resisting independent movement and absorbing a portion of the energy which would otherwise develop vibration. It is the object of the present invention to greatly simplify the construction of such a vibration dampener and to facilitate its application to engine crank shafts and other rotary members. To this end the invention consists in the construction as hereinafter set forth.

Figure 1:
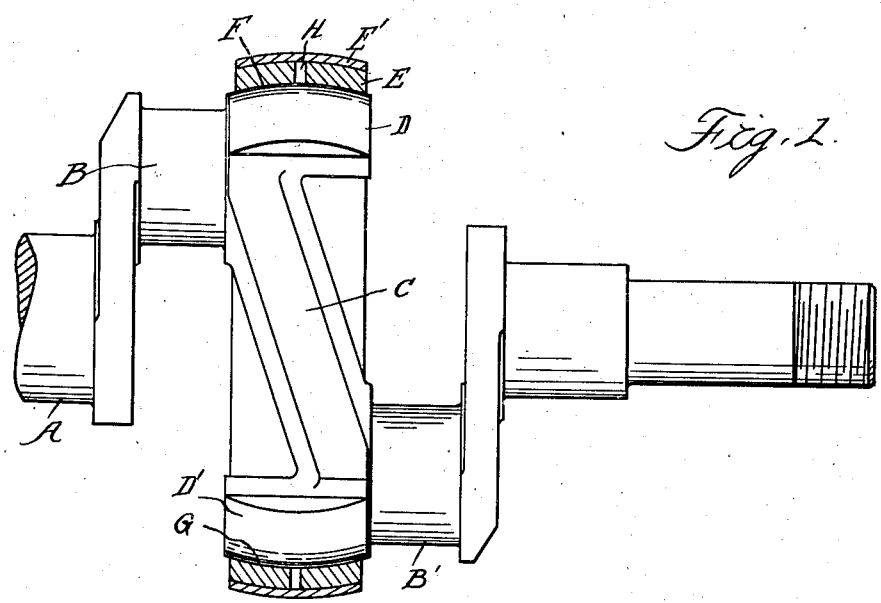
Figure 1 is a sectional side elevation of a portion of an engine crank shaft to which my improvement is applied.
Figure 2:
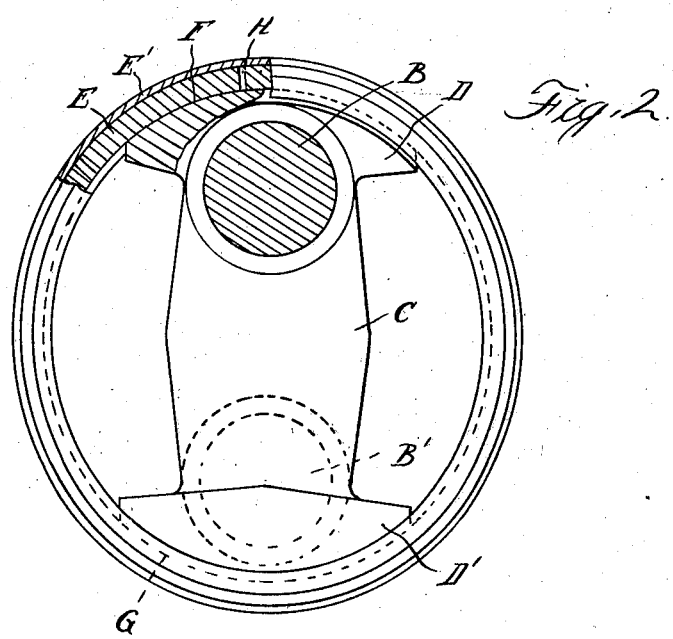
Figure 2 is a sectional end elevation thereof.

A is the engine crank shaft which in the portion shown is provided with crank pins B and B' on diametrically opposite sides of the axis of the shaft and connected to each other by the intermediate throw or cheek plate C. My improved vibration dampener may be applied to the crank shaft in any convenient position but as illustrated it is arranged intermediate the crank pins B and B'. The construction consists essentially of a journal bearing formed on the shaft which is engaged by an annular member capable of independent rotation. The frictional resistance is developed by springing this annular member over the bearing whereby the inherent resiliency will produce the desired pressure of the friction faces upon each other.

For convenience in manufacturing the journal bearing may be formed of segments D and D' which are formed integral with the cheek plate respectively adjacent to the pins B and B'. These segments are preferably of a radius slightly less than the radial length to the axis of the shaft so as to approximate an elliptical form. Surrounding the bearings D and D' is the annular member E which is formed of resilient material and with its inner surface of a diameter less than the diameter of the segments D and D' in the central plane thereof. Thus to engage the member E with the bearings D and D' it must be distorted in form or sprung over said bearings, thereby producing a radially inward tension for developing frictional resistance.

To retain the member E in engagement with its bearings, the latter may if desired be formed with convex surfaces as indicated at F and the annular member E may be correspondingly formed with a concave surface as indicated at G. These surfaces being substantially spherical the member E may be readily engaged with the bearings by first arranging it in a plane which is transverse to the plane of rotation and then springing it over the bearings into said plane of rotation in which it will be retained by centrifugal action. The fact that the bearings D and D' are merely segments, leaving a relatively large cut-away portion therebetween, facilitates the distortion of the member E and its engagement with said bearings.

With the device as thus far described, in operation the inertia of the member E will cause it to lag during positive acceleration of the crank shaft, and to move in advance thereof during negative acceleration. Such independent movement is however, accompanied by frictional loss of energy which is dissipated in the form of heat. This will prevent the storage of energy in the resilient material of the crank shaft which, if permitted, would result in vibrations.

Vibrations are usually most intense at certain critical speeds of the shaft with which they synchronize, and there may be a succession of points in the acceleration of the shaft at which vibrations develop. My improved construction permits of using a plurality of dampeners which are respectively adjusted to the different vibration periods. Thus instead of employing a single ring E, I may surround this by one or more additional rings E'. These will be similarly distorted when the ring E is engaged with the bearings D and D' and consequently will develop friction between each other as well as with the inner bearing. The function of each ring is dependent upon the mass and the tension which develops the friction so that by suitable design any desired effect may be produced.

If desired the friction surfaces may be lubricated, this occuring automatically where the dampener is located within the engine crank case. The cut-away portions between the bearings D and D' permit access of the lubricant to the inner side of the ring E, and apertures such as H extending through this ring provide access to the friction surface of the outer ring E'. It is obvious, however, that instead of using a lubricated metal contact surface, any approved friction or braking surface may be employed and with or without lubricant.

What I claim as my invention is:

1. The combination with a rotary member subject to alternating positive and negative accelerations, of a journal bearing on said member and an annular sprung member over said bearing and held by its resiliency in frictional contact therewith.

2. The combination with a rotary member subject to alternating positive and negative accelerations, of a journal bearing on said member and a plurality of concentric annular sprung members over said bearing and thereby tensioned to produce frictional engagement between each other and the bearing, said annular members being proportioned in mass and tension to respond to different vibration periods of said rotary members.

3. The combination with a rotary member subject to alternating positive and negative accelerations, of diametrically opposed segmental journal bearings on said rotary member, and an annular sprung member over said segmental bearings and held by its resiliency in friction contact therewith.

4. The combination with a rotary member subject to alternating positive and negative accelerations, of diametrically opposed segmental journal bearings on said member, an annular sprung member over said bearings and held by its inherent resiliency in frictional contact therewith, and means for lubricating the surface of said annular member and bearing segments which are in frictional contact.

5. The combination with an engine crank shaft having a pair of crank pins and an intermediate crank throw, of segmental journal bearings upon said throw adjacent to the respective crank pins and an annular sprung member over said segments and held by its resiliency and distortion from normal form in frictional contact therewith.

6. The combination with a rotary member subject to alternating positive and negative accelerations, of bearing segments on opposite sides of said member of convex cross section in an axial plane and an annular sprung member over said bearings and having its inner surface concave in axial cross section to frictionally engage said bearings.

In testimony whereof I affix my signature.

ALANSON P. BRUSH.